United States Patent [19]

Kuchler

[11] Patent Number: 4,763,738
[45] Date of Patent: Aug. 16, 1988

[54] SLICING MACHINE FOR COLD CUTS

[75] Inventor: Fritz Kuchler, Klagenfurt, Austria

[73] Assignee: Brain Dust Patents Establishment, Vaduz, Liechtenstein

[21] Appl. No.: 911,960

[22] Filed: Sep. 25, 1986

[30] Foreign Application Priority Data

Sep. 25, 1985 [AT]  Austria ................................. 2796/85

[51] Int. Cl.⁴ ..................... G01G 19/52; G01G 13/02; G01G 23/10; B26D 7/06
[52] U.S. Cl. ..................................... 177/50; 177/120; 177/185; 83/23; 83/77
[58] Field of Search ................... 177/50, 120, 211, 185

[56] References Cited

U.S. PATENT DOCUMENTS

| | | | |
|---|---|---|---|
| 3,476,198 | 11/1969 | Francis | 177/50 |
| 3,995,517 | 12/1976 | Smith | 177/50 X |
| 4,136,504 | 1/1979 | Wyslotsky | 177/50 X |
| 4,217,650 | 8/1980 | Kuchler | 364/567 |
| 4,379,416 | 4/1983 | Kuchler | 83/23 |
| 4,545,447 | 10/1985 | Spooner et al. | 177/50 X |
| 4,593,778 | 6/1986 | Konishi et al. | 177/185 |
| 4,598,618 | 7/1986 | Kuchler | 83/77 |
| 4,657,097 | 4/1987 | Griffen | 177/211 |

*Primary Examiner*—George H. Miller, Jr.
*Attorney, Agent, or Firm*—Herbert Dubno

[57] ABSTRACT

A slicing machine for cold cuts with a carriage for the goods to be sliced (2), an arresting plate, a blade (3) a depositing device (4) and a depositing tray (7) on a slidable, rotatable or vertically adjustable tray carrier (8) is equipped with a load cell (10), to which the depositing tray (7), respectively its carrier is fastened on the load side. The load cell (10) is mounted on the carrier (8) to ride along therewith. The load cell (10) is connected to an evaluating circuit and an indicator (19,21). A keyboard (6,20) for the price per kilogram or for the input of a target weight, respectively of a desired number of slices can further be provided, which is connected over the evaluating unit with the drive of the carriage (2) for the foodstuff to be cut, for the purpose of its uncoupling. Further, the evaluating circuit of the load cell (10) can also be connected with the control of the depositing device (4, 5), whereby from the weight of the first cut-off slice, with a given target-weight signal, the number of slices per complete row of cold cuts can be established. A damping of the indication during the depositing process, respectively a keying out of the overshot signals of the load cell, can be provided (FIG. 1).

8 Claims, 1 Drawing Sheet

SLICING MACHINE FOR COLD CUTS

FIELD OF THE INVENTION

The invention relates to a slicing machine for cold cuts, especially sausage, having a carriage for the goods to be sliced, an arresting plate, a blade and a depositing tray which is the scale of a weighing device provided in the housing of the machine.

BACKGROUND OF THE INVENTION

A slicing machine with a weighing device incorporated in its housing is known from Swiss Pat. No. 326 939. The cut-off slices fall onto the depositing tray for the sliced goods, which at the same time is a scale. The slicing process can then be interrupted, whenever the target weight is reached. While the above-mentioned patent relates to a sliding weight scale, the Swiss Pat. No. 376 381 describes a dial scale in combination with a slicing machine for cold cuts.

Weighing devices are precision instruments, they have to be calibrated and positioned horizontally with the aid of a level. Good stability and a steady mounting place are prerequisities for accuracy.

Independently therefrom, there are known slicing machine for cold cuts, which have a slidable or rotatable tray support and whose depositing point is variable. These machines make possible the slicing and depositing of the cut-off slices in an overlapping manner in rows, which in turn overlap each other partially.

A table-ready arrangement of cold cuts results. Therefore, the machines in question are sometimes also called serving slicing machines. Reference may be had in particular to U.S. Pat. No. 3,834,259, but also to U.S. Pat. Nos. 4,217,650, 4,338,836, 4,586,632, 4,586,409, 4,379,416 and 4,598,618.

The serving slicing machines built to be counter appliances, with a program-controlled, longitudinally-slidably driven depositing tray cannot meet the above-listed requirements which have to be met by a weighing device. A stationary scale is not suitable for the serving slicing machines of the mentioned kind. As a result, in the last decades, workers in this field have not pursued the idea of incorporating a weighing device in a slicing machine for cold cuts with a program-controlled, longitudinally-slidably driven depositing tray.

OBJECT OF THE INVENTION

The object of the invention a slicing machine for cold cuts having a longitudinally slidable, and, in given cases, vertically adjustable depositing tray with a weighing scale, contrary to the prejudices of the art which has avoided this concept in the past.

SUMMARY OF THE INVENTION

In a slicing machine for foodstuff, especially for sausage, with a carriage for the goods to be sliced, an arresting plate, a blade and a depositing tray, this object is attained by mounting the depositing tray on a support of a slidable, and possibly vertically adjustable tray carriage by a load cell riding together with the tray carriage. An evaluation circuit and an indicator are connected to the load cell.

These features make possible the incorporation of a calibratable weighing system into the slicing machine for cold cuts with slidable, and if necessary, vertically adjustable tray carriage, without modifying the appearance of the machine. The indicator, which is the only difference visible from the outside by comparison to the traditional machine, precisely displays the weight, even when the load is eccentrically applied on the tray.

Further, according to the invention, it is possible to provide the evaluation circuit with a keyboard for keying in the price per kilogram, and, in given cases the target weight or the desired number of slices and with a connection circuit with the drive of the carriage for the food to be sliced, in order to disconnect the latter when the target weight or the desired number of slices are reached.

Consequently the slicing of cold cuts can be set automatically to an exact target weight. The salesperson has sufficient time to assist the customer in further purchases. Machines with a control of the depositin device for depositing the cut-off slices in parallel rows or in concentric circles are characterized, according to a furher development of the invention, in that the evaluation circuit of the load cell is electrically connected to the control of the depositing device, and, following the input of a desired target weight, from the weight value of the first cut-off slice supplied to a computer associated with the control, automatically determines the number of slices per row in order to reach a symmetrical arrangement of the deposited slices and to supply the control command to the depositing device.

Thus, depending from the weight of the first cut-off slice (for instance 0.83 dag) and from the target weight (for instance 10 dag) the distribution over rows as long as possible in order to create an appealing appearance, (for instance 3 rows with 4 slices each) can be determined.

Further, I can disconnect the load cell for short time spans and/or disconnect the evaluation circuit and/or the indicator, during the intermittent connection of the depositing device, particularly when the beater-drive is connected for the release of a cut-off slice. Thus the impulses coming from the slices falling on the depositing tray during the depositing process and possible false measuring values triggered thereby are prevented from reaching the indicator. A memory provided in the indicator device or preceding it, can keep transmitting the stable value to the indicator, until a new stable measuring value is furnished. This ensures a continuous indication during the slicing process.

In another embodiment, in the electric circuit between the load cell and the indicator device, an electrical damping- or retardation circuit is provided, or a timing element for keying out the oscillating measuring values produced by the oscillations of the depositing tray due to the impact of the falling cut-off slices. In this case too, the indicator remains uninfluenced by the interfering factors resulting from the discharge of the slices from the depositing device onto the depositing tray. Together with the machine, a cutting scale center is at the disposal of the salesperson, which not only tremendously facilitates the work, but also creates the possibility to offer to the customer the desired weight and arrangement of the cold cuts, without handling them directly.

SPECIFIC DESCRIPTION

Figure 1:
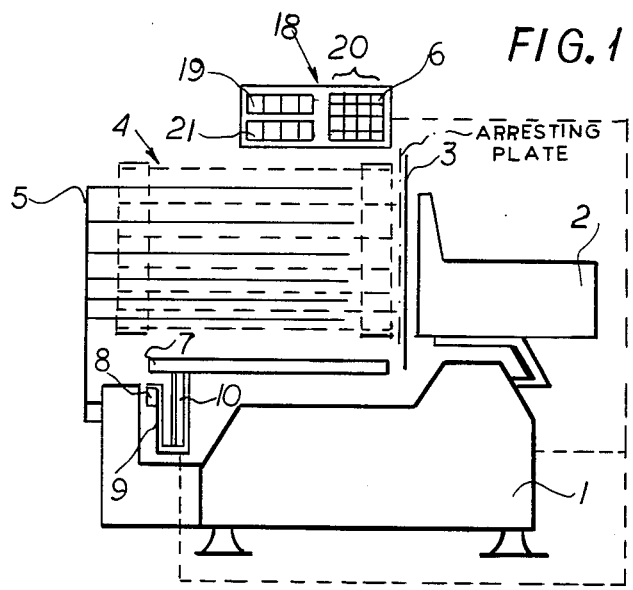
FIG. 1 is a schematic view of the slicing machine for cold cuts, seen from the serving side.
Figure 2:
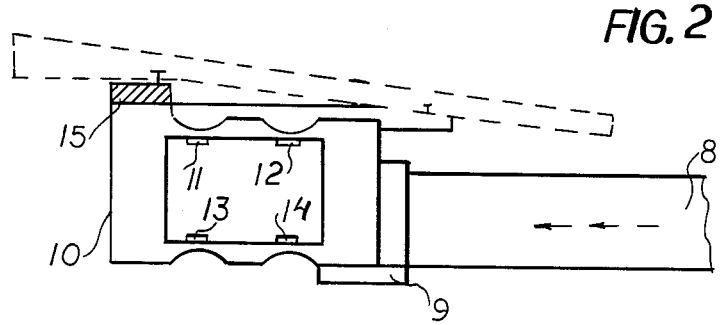
FIG. 2 is a detail, a side view of the tray-carrier with load cell, in a section according to line II—II.
Figure 3:
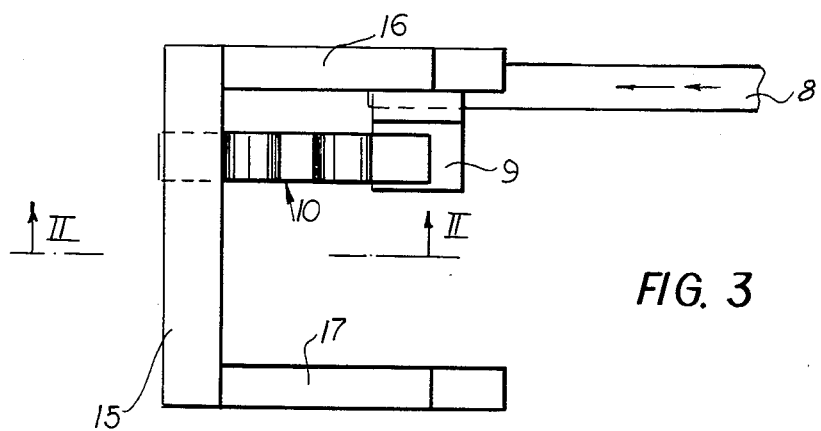
FIG. 3 shows a top view of the tray-carrier, the load cell and the frame for the tray.

A slicing machine for cold cuts according to FIG. 1, comprises a base housing 1 with a drive, which can be uncoupled, for a carriage 2 for the food to be sliced, and oppositely thereto an adjustable arresting plate, and in continuation thereto a rotating disk blade 3. The depositing device consists of a chain-frame 4 with rollers and parallel chains with needle-like spikes, as well as a beater 5, whose fingers grip the chains in the rest position (see U.S. Pat. No. 3,834,259). The drive for the rollers and the chain frame is located in the base housing 1 and is program-controlled, so that according to the program selection (key 6) a different conveying path of the chains for the respective cut-off slices pinned on the spikes results. The slices are detached from the spikes by the fingers of the flappable beater and are thrown onto the depositing tray 7 in a very precise manner. The depositing tray 7 is detachably mounted on tray carrier 8. The carrier 8 is program-controlled to be parallely displaced in steps, so that parallel rows of slices can be deposited over the entire surface of the depositing tray 7. A cold cuts arrangement evenly distributed over the surface is obtained, on one hand due to the variable discharge point of the depositing device 4, 5 and, on the other hand, due to the parallel displacement of the depositing tray 7. An angled piece 9, carrying the load cell 10 (FIG. 2) is attached to the carrier 8. This cell 10 has the shape of a cantilevered frame, which is subjected to deformation under load. In the area of four cross-sectional constrictions of the frame, electrical wire strain gauges (resistances) 11, 12 13, 14 are provided which are connected as electrical bridges (Wheatstone bridges). The load cell 10 has a rigid bar 15, from which extend the arms 16, 17. This U-shaped carrying structure (FIG. 3) supports the depositing tray 7, (shown in broken lines in FIG. 2), is supported only by the load cell 10 and follows the movements of the tray carrier 8, according to the program of the slicing machine for cold cuts.

The elctrical signal of the riding load cell 10 reaches, for instance, over flexible circuit, the evaluation unit in the base housing 1, or directly the control element 18, which is arranged as a little box over the depositing device 4. In the indicator box 19, the real weight is shown. Via a keyboard 20, the price per kilogram can be shown together with the price corresponding to the real weight of the cold cuts. For this, the indicator box 21 is provided. Over the keyboard a target weight (for instance 10 dag) can also be keyed in. As soon as the target weight corresponds to the real weight, the machine gives a signal, when manually operated. When automatically operated, which means that the carriage for the food to be sliced 2 is automatically driven back and forth, the drive of the carriage for the food to be sliced is automatically uncoupled when the target weight is reached. The correlation between the load cell 10, the machine control in the base housing 1 and the indicator- and control element 18 is represented in broken lines in FIG. 1. The afore-mentioned uncoupling can also take place when a target price is reached.

With the pick-up of the weight of the first slice deposited on the tray 7, due to the input of the target weight and target price into a computer of the control for the depositing device 4, 5 and the tray-displacer (carrier 8), one can determine arrangement designs of the cold cuts, so that completely filled rows (block style) result. Thus, the number of slices per row and the number of rows, and in given cases, the intervals between the slices in a row are determined according to the target weight. When a round plate is used, a load cell can also be incorporated between the central pivot and the round tray, so that the afore-described possibilities are the same with respect to the signal evaluation.

I claim:

1. In a slicing machine for a foodstuff, comprising a carriage for the foodstuff to be sliced, an arresting plate against which said foodstuff on said carriage can be pressed, a blade for severing a slice from the foodstuff on said carriage pressed against said arresting plate and a depositing tray provided with a tray carrier which is shiftable relative to said blade to determine a pattern of slice deposition on said depositing tray, the improvement which comprises:

a load cell interposed between said carrier and said tray, offset to one side of said tray, travelling with said tray and constituting the sole support of said tray on said carrier whereby said load cell has an output representing weight of slices deposited on said tray;

an evaluation circuit connected to said load cell and responsive to said output for generating an electrical signal indicating said weight; and an indicator connected to said evaluation circuit and responsive thereto for displaying said weight.

2. The improvement defined in claim 1 wherein said circuit includes means for filtering out weight oscillations resulting from impact on said tray by slices as they are deposited.

3. In a slicing machine for a foodstuff, comprising a carriage for the foodstuff to be sliced, an arresting plate against which said foodstuff on said carriage can be pressed, a blade for severing a slice from the foodstuff on said carriage pressed against said arresting plate and a depositing tray provided with a tray carrier which is shiftable relative to said blade to determine a pattern of slice deposition on said depositing tray, the improvement which comprises:

a load cell interposed between said carrier and said tray and constituting the sole support of said tray on said carrier whereby said load cell has an output representing weight of slices deposited on said tray;

an evaluation circuit connected to said load cell and responsive to said output for generating an electrical signal indicating said weight; and an indicator connected to said evaluation circuit and responsive thereto for displaying said weight, said load cell is provided with a generally U-shaped frame having a bar formed with cantilevered arms at ends of said bar for supporting said tray on said load cell.

4. The improvement defined in claim 3 wherein said carriage is automatically driven and said evaluation circuit is provided with a keyboard for inputting price per kilogram of the foodstuff and another parameter including target weight of slices to be deposited and number of slices to be deposited, and means operatively connected to said carriage for decoupling the automatic drive thereof when the parameter is reached.

5. The improvement defined in claim 3 wherein said evaluation circuit is provided with means responsive to an inputted target weight for controlling said pattern.

6. In a slicing machine for a foodstuff, comprising a carriage for the foodstuff to be sliced, an arresting plate against which said foodstuff on said carriage can be pressed, a blade for severing a slice from the foodstuff on said carriage pressed against said arresting plate and a depositing tray provided with a tray carrier which is shiftable relative to said blade to determine a pattern of slice deposition on said depositing tray, the improvement which comprises:
- a load cell interposed between said carrier and said tray and constituting the sole support of said tray on said carrier whereby said load cell has an output representing weight of slices deposited on said tray;
- an evaluation circuit connected to said load cell and responsive to said output for generating an electrical signal indicating said weight;
- an indicator connected to said evaluation circuit and responsive thereto for displaying said weight; and
- means for disconnecting said load cell briefly during deposition of a slice to render weighing of deposited slices independent of transient displacement of said tray resulting from a deposition of a slice.

7. In a slicing machine for a foodstuff, comprising a carriage for the foodstuff to be sliced, an arresting plate against which said foodstuff on said carriage can be pressed, a blade for severing a slice from the foodstuff on said carriage pressed against said arresting plate and a depositing tray provided with a tray carrier which is shiftable relative to said blade to determine a pattern of slice deposition on said depositing tray, the improvement which comprises:
- a load cell interposed between said carrier and said tray and constituting the sole support of said tray on said carrier whereby said load cell has an output representing weight of slices deposited on said tray;
- an evaluation circuit connected to said load cell and responsive to said output for generating an electrical signal indicating said weight;
- an indicator connected to said evaluation circuit and responsive thereto for displaying said weight; and
- means for disconnecting said evaluation circuit briefly during deposition of a slice to render weighing of deposited slices independent of transient displacement of said tray resulting from a deposition of a slice.

8. In a slicing machine for a foodstuuf, comprising a carriage for the foodstuff to be sliced, an arresting plate against which said foodstuff on said carriage can be pressed, a blade for severing a slice from the foodstuff on said carriage pressed against said arresting plate and a depositing tray provided with a tray carrier which is shiftable relative to said blade to determine a pattern of slice deposition on said depositing tray, the improvement which comprises:
- a load cell interposed between said carrier and said tray and constituting the sole support of said tray on said carrier whereby said load cell has an output representing weight of slices deposited on said tray;
- an evaluation circuit connected to said load cell and responsive to said output for generating an electrical signal indicating said weight;
- an indicator connected to said evaluation circuit and responsive thereto for displaying said weight; and
- means for disconnecting said indicator briefly during deposition of a slice to render weighing of deposited slices independent of transient displacement of said tray resulting from a deposition of a slice.

* * * * *